July 20, 1943.　　　C. O. SHERRILL　　　2,324,885
MOTOR VEHICLE WINDSHIELD STICKER
Filed Jan. 29, 1942
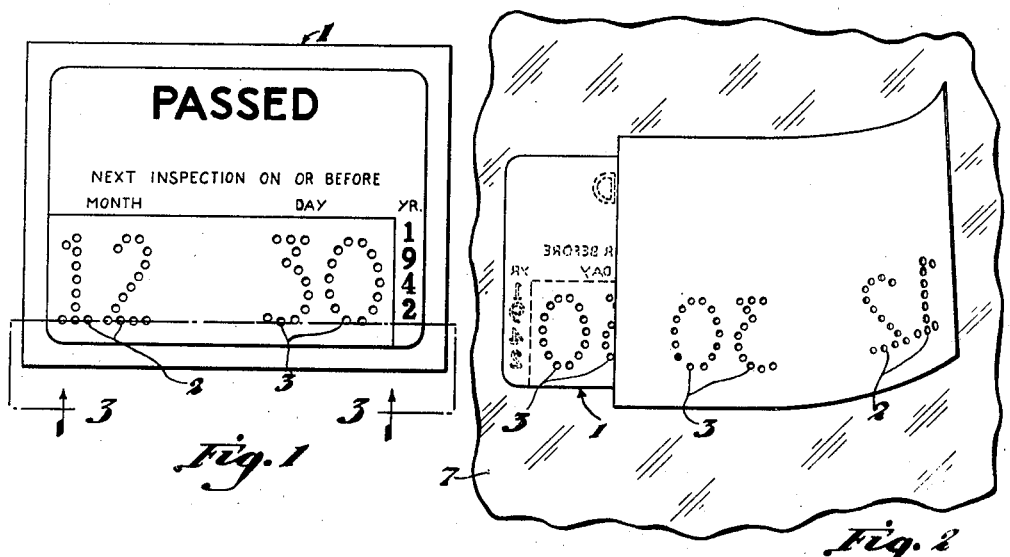
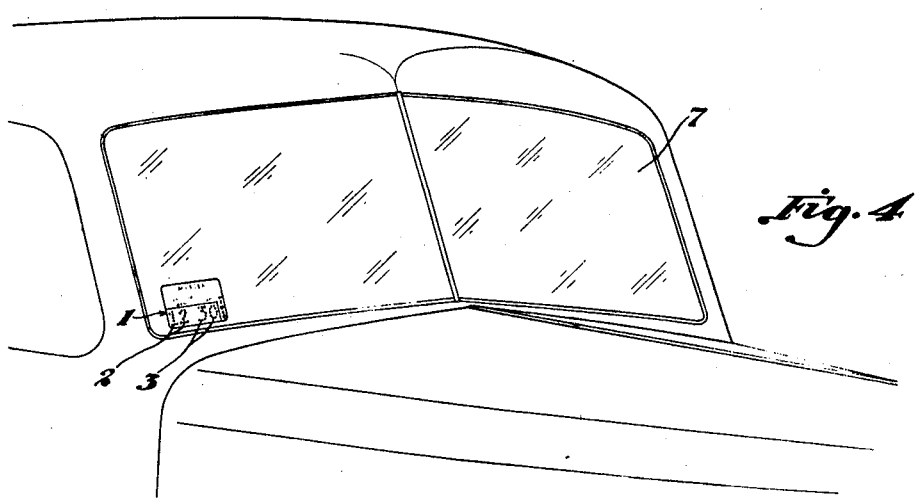
INVENTOR.
Clarence O. Sherrill
BY
Word, Avey, Herron & Evans
ATTORNEYS Patented July 20, 1943

2,324,885

UNITED STATES PATENT OFFICE 2,324,885

MOTOR VEHICLE WINDSHIELD STICKER

Clarence O. Sherrill, Cincinnati, Ohio

Application January 29, 1942, Serial No. 428,758

1 Claim. (Cl. 283—21)

This invention relates to a sticker adapted to be affixed to the windshield of a motor vehicle and so constructed and configurated as to indicate to a person driving the car and also at a distance outside of the motor vehicle various types of data or information relating to the motor vehicle. As a preferred example of the type of data or information adapted to be disclosed by the sticker this application will deal with the subject of compliance with the motor vehicle inspection laws of municipalities and states.

Within recent years various municipalities and states have adopted legislation requiring all motor vehicles regularly operated on the highways of the municipality or state to submit to periodic inspections to determine the fitness of the vehicle for further operation. Examination may be made of the condition of the brakes, tires, steering gear or other accessories having some relation to the safety of the vehicle on the highways.

When the vehicle has successfully passed the required examination, heretofore it has been conventional to place on the vehicle some form of indicia in the form of a tag, sticker or decalcomania usually positioned on the windshield so that those charged with enforcement of the inspection legislation can tell that the vehicle in question has satisfactorily passed the examination at some previous date.

Since examinations of the type described must be made at regular periodic intervals if they are to be of any value, there has been a problem in marking vehicles which have passed the examination for a particular period, such as, for example, the period from January 1, 1941, to July 1, 1941, in such a way as to readily distinguish them from vehicles which have passed a later periodic test, such as, for example, during the period from July 1, 1941, to January 1, 1942. There has been a further problem in providing an easy method of quickly determining the exact date on which the motor vehicle has last passed the inspection at the safety lane and also the date on or before which it must again be inspected. Although these problems can be met to some extent by the use of windshield stickers or decalcomanias of different color, this solution has not been even reasonably satisfactory because the number of primary colors is limited, the wastage of unused seals is large, the cost of printing is much increased when a change of color is required, and the exact date cannot be so shown.

Another and more difficult problem has been that of providing periodic inspection dates for each individual car and to so stagger these dates that the facilities of the examining stations will be kept normally busy throughout the year without a tremendous rush of business at any particular period. Obviously, if there is a great disparity between the numbers of persons visiting the safety lane during particular periods, the problem of employing a proper number of officials is a difficult one as is also that of purchasing the correct number of stickers.

With the solution of these and other similar problems in mind one of the objects of the present invention has been to provide a sticker or decalcomania for attachment to the windshield of an automobile which will indicate at a glance to a person some distance away and to the driver in the car that the particular automobile has passed a safety inspection and must submit to another one on or before a particular date which is indicated in the body of the sticker.

Another object has been the provision of a simple and inexpensive sticker or decalcomania adapted for use for the purpose indicated in which the critical date is formed by lines of spaced apertures formed in the body of the sticker or decalcomania in such a way as to impart the necessary information clearly and quickly without appreciable weakening of the sheet or film from which the sticker or decalcomania is formed.

Another purpose has been to provide a decalcomania on the surface of which indicia may be added at times other than at the original printing and of information other than that originally appearing thereon by punching means adapted to operate simultaneously on substantial numbers of stickers.

Another object has been to provide a method of adding additional required indicia to a safety lane decalcomania without marring the surface or weakening the structure thereof and thereafter affixing the decalcomania to a windshield.

Another object has been to provide in combination the windshield of a motor vehicle and a sticker or decalcomania constructed and configurated so as to supply desired information quickly and easily read at a distance from the car.

Other and further objects and advantages will be apparent from a consideration of the further and more detailed description of the invention when considered in conjunction with the drawing in which:

Figure 1 is a front elevation of a sticker or decalcomania of the type of the invention.

Figure 2 is a rear elevation of a decalcomania showing the backing in the process of being removed.

Figure 3 is a sectional view along the line 3—3, Figure 1, illustrating the various layers of a "transparency" type of sticker.

Figure 4 is an elevation showing the sticker or decalcomania in a preferred position on the windshield of a motor vehicle.

The stick 1 may be a decalcomania or it may be a similar type of sticker known in the trade as a "transparency." In a conventional decalcomania a coating of a composition principally composed of sizing and gum is first applied to a sheet of paper. An ink film showing the desired printing matter is then placed on the surface of this coating and a coating of glue is placed on top of the ink film. In a transparency, on the other hand, a base sheet of thin paper, such as onion skin, is employed. This sheet is represented by 4, Figure 3. An ink film 5, Figure 3, similar to that used in a decalcomania is then placed directly on the sheet and the whole is then coated with glue 6. Since in the transparency the coating of sizing and gum is omitted the ink film cannot be removed from the backing as in the case of a decalcomania. However, both types of stickers are well adapted to certain aspects of the present invention regardless of the differences in structure.

The sticker 1, Figure 1, may be substantially rectangular, as shown in the preferred embodiment, and should contain indicia such as the word "passed" to indicate that the vehicle has been examined. The other class of required indicia is that indicating the month and day on or before which the vehicle must next appear for reexamination. It has been an important concept of this invention to provide this type of indicia in the form of letters or figures formed from lines of apertures of substantial size for easy legibility at a distance; said lines being punched through the body of the sticker. In the drawing the lines applicable to the month of the year are indicated at 2 and those applicable to the day of the month at 3. They may also be indicated by letters as APR (for April) and figures for the day of month or even by a single figure for the day of the year such as, for example, 252. As will be noted in Figure 2, in a decalcomania these lines pass completely through the backing as well as the ink film.

There are several important reasons for providing indicia relative to the date of next inspection which can be added readily to a previously printed sticker or decalcomania and which can be formed from aperture lines. In the first place, it is very desirable to stagger the appearance for inspection of all of the motor vehicles in a given jurisdiction to avoid crowding of the examining facilities and to stabilize the number of the operating force. For this reason, it is desirable that the date of next inspection placed on the motor vehicles being examined be changed frequently, for example, daily. It would obviously be impractical in a large municipality to print up in advance of use new batches of stickers for every day to show the changed date. In addition, an important feature of this invention is that the date, on or before which the next inspection occurs, can be varied as desired by the operator of the inspection lane to cause only the desired number of cars to return for inspection on or before any given future date by changing the adjustment of the punching means.

Although it would be possible to apply a sequence of dates to the face of a decalcomania or transparency by stamping one at a time by hand, this is a very slow operation and because of the coating of glue present on the face it is difficult to obtain a clear registration. It is possible also to form the numerals by stencil cutting so that instead of appearing as lines or apertures they will appear in substantially straight sections as in a cut stencil with ties.

This type of numeral is not as satisfactory however as the preferred form utilizing perforated lines because in the case of a decalcomania the ink film is apt to break and partially disintegrate while the backing is being removed if the openings are too large or have sections too close together. In the case of a transparency, difficulty is encountered in firmly and smoothly adhering the sticker to the windshield because to do this properly requires considerable rubbing on the back and this will inevitably tend to break the ties in this type of stencil.

An additional advantage of forming the numerals by lines of apertures as described is that numerals formed from such lines may be made very much larger than those formed by stencil cutting without weakening the body of the sticker. In this type of stickers it is highly desirable to have the numerals of substantial size so that they can be seen readily from a distance by enforcement officials. When the sticker of the type of the invention is positioned on a windshield such as 7, Figure 4, it has been found that numerals formed by lines of apertures in the sticker stand out very prominently to an observer outside the car because of the black background of the interior of the automobile as contrasted with the sticker. This is clearly indicated in Figure 4. It has also been found that lines formed from a series of spaced apertures stand out more prominently than those formed by stencil cutting or the like.

In the practical use of the invention the operator of the motor vehicle inspection bureau may have on hand a large quantity of stickers bearing identical indicia relating to passage of the inspection but with the month and day on or before the next examination left in blank. As a car is examined and passed, the date on or before which the next examination must be made which may be three or six months hence is punched in the face of the sticker as indicated in Figures 1 and 2 by any conventional punching device adapted to form figures from lines of apertures of substantial size. For this purpose I prefer to use a hand operated punch large enough and strong enough to punch a substantial number of stickers at the same time. If the sticker is in the form of a decalcomania it is then applied to the inner surface of the windshield as indicated in Figure 2. The inner surface is preferable as a protection against theft and weather. If it is a transparency or some other form of sticker the same operation is performed but, differing from a decalcomania, the backing is not removed but is left in position. The finished sticker positioned as indicated in Figure 4 clearly shows the date on or before which the next examination must be made even at a considerable distance and serves as a constant remainder to the motorist as well as the enforcement officials.

Having described my invention, I claim:

Motor vehicle inspection indicia comprising a motor vehicle windshield formed from glass or the like and a sticker positioned thereon; said sticker comprising a backing and lines of spaced apertures punched therethrough to form date indicating characters; said windshield glass constituting darkened background for providing contrast between the aperture formed indicia and the sticker backing to an observer positioned at the front of the windshield.

CLARENCE O. SHERRILL.